March 3, 1936.  V. KUTNAR  2,032,848
AIRPLANE
Filed Nov. 26, 1934  4 Sheets-Sheet 3
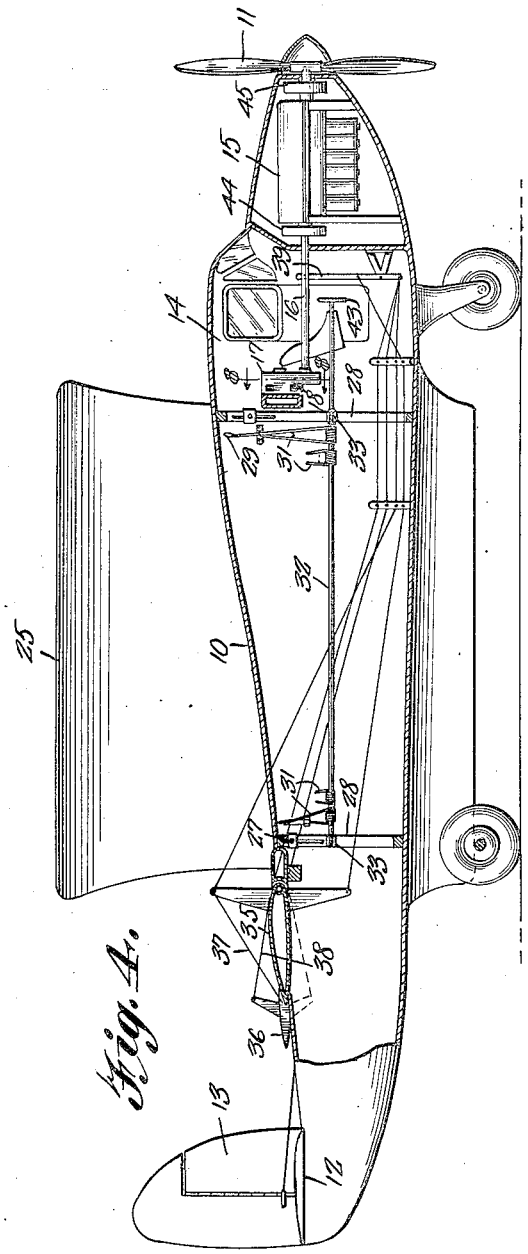
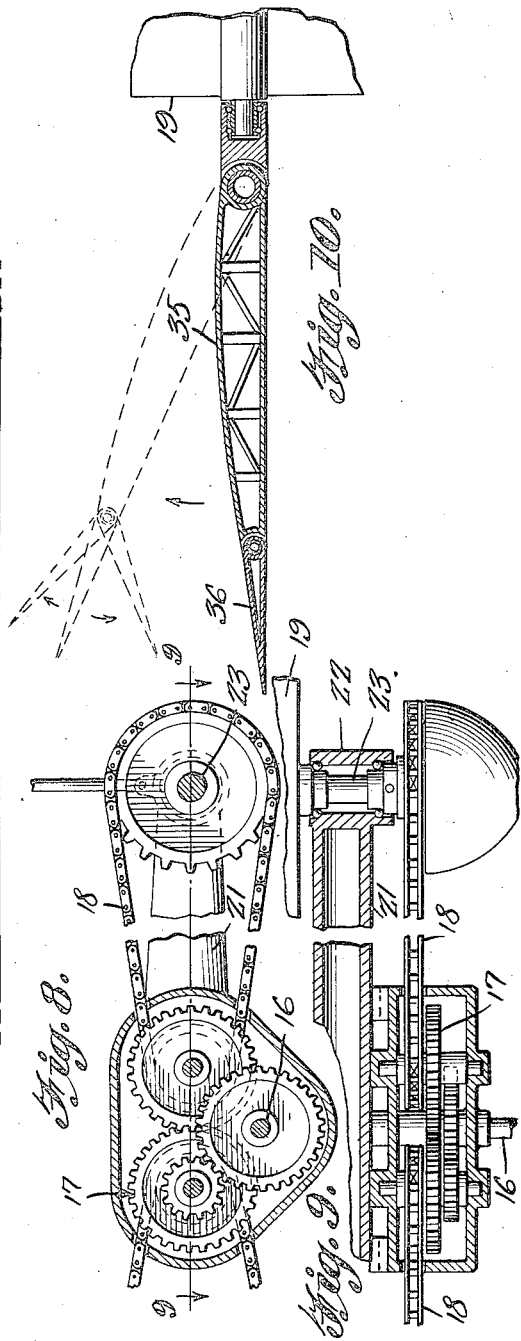
Virgil Kutnar,
INVENTOR

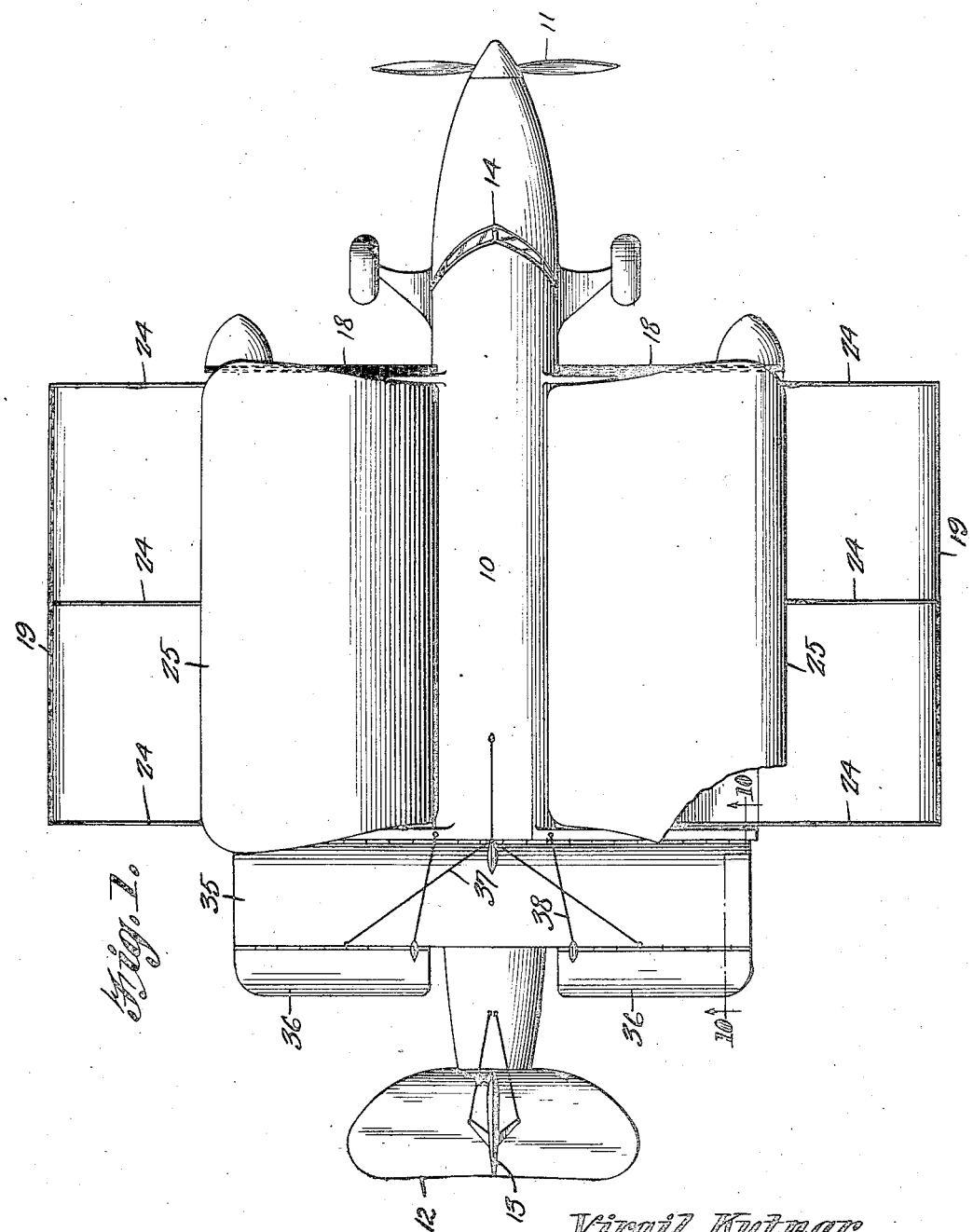

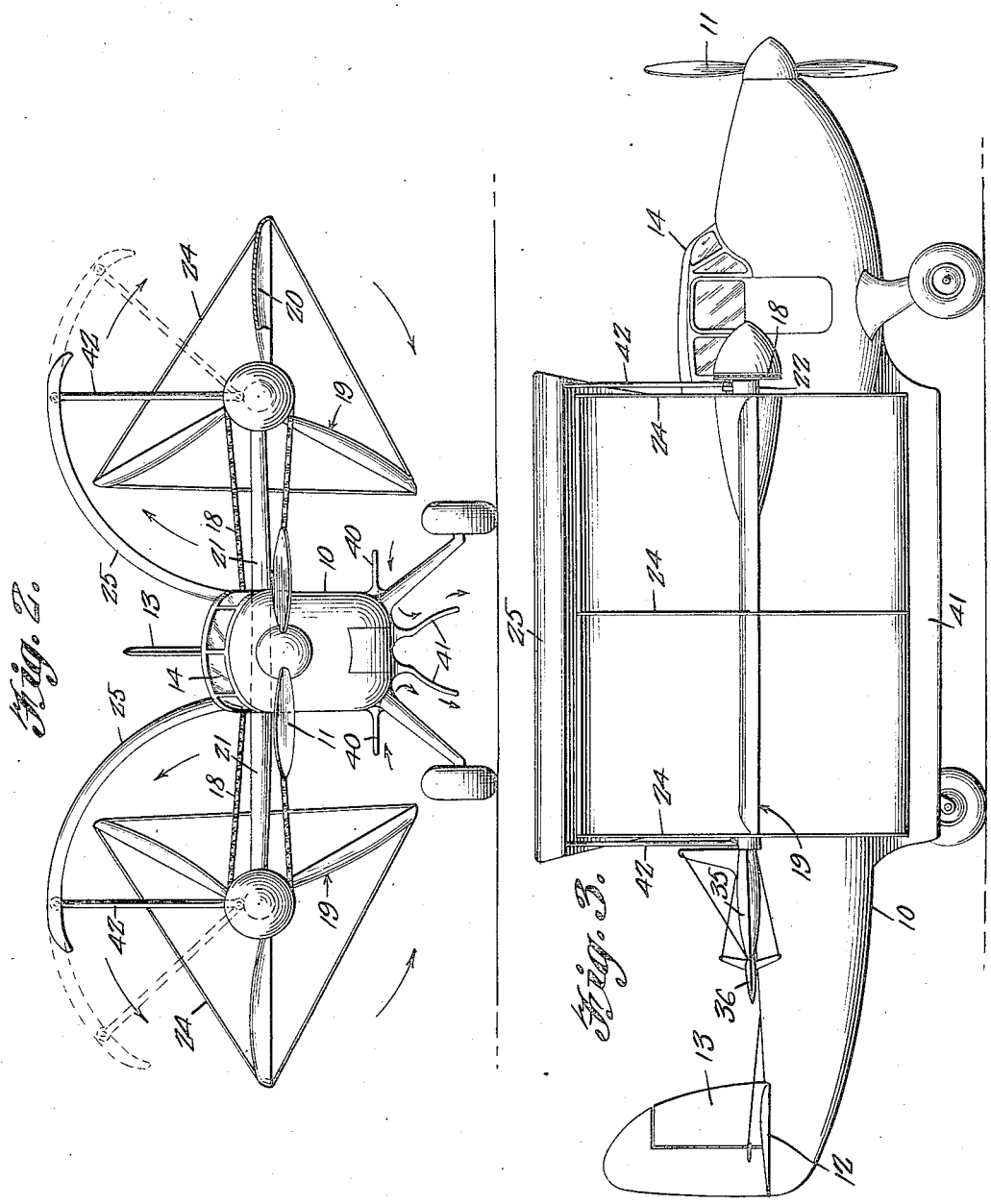

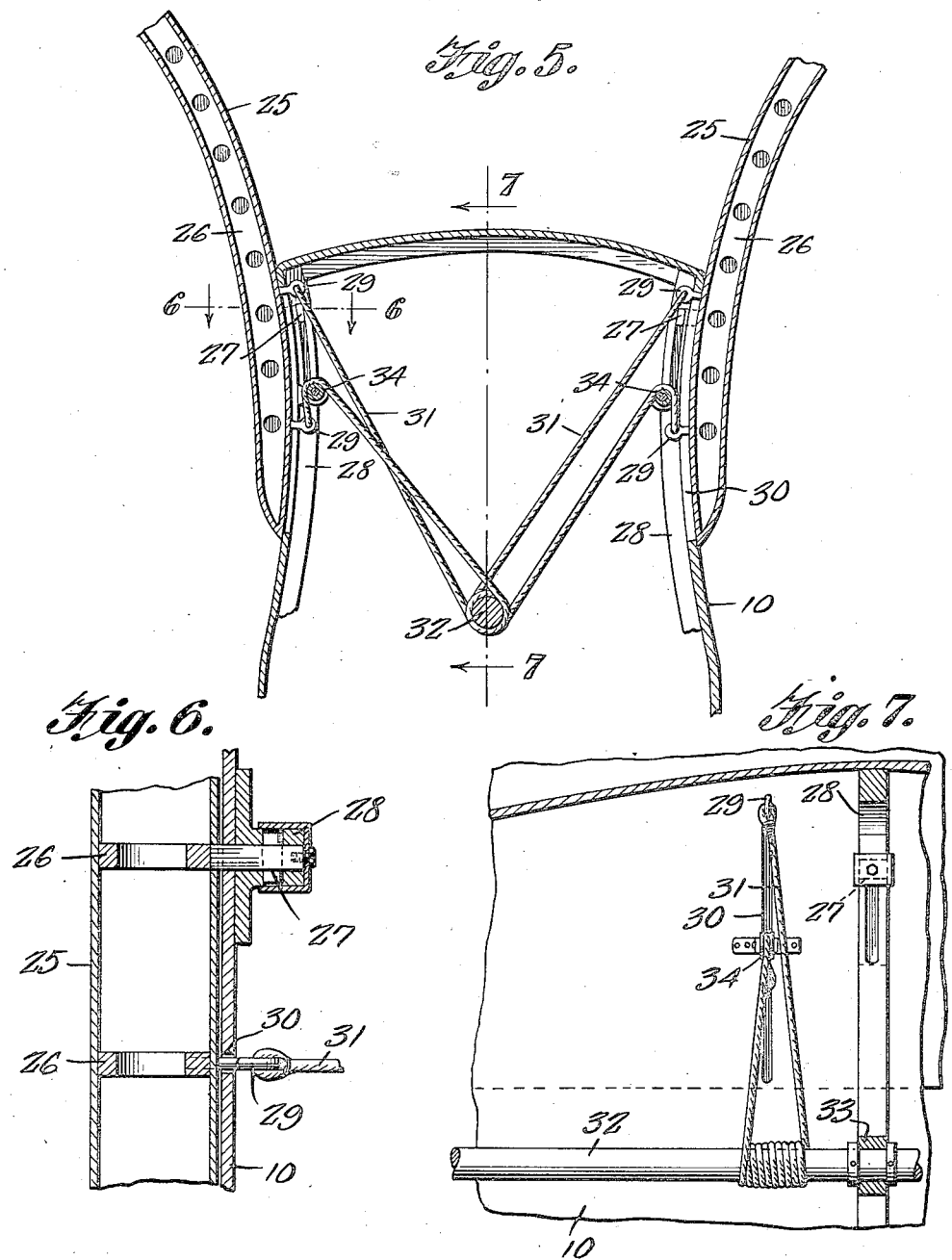

Patented Mar. 3, 1936

2,032,848

UNITED STATES PATENT OFFICE 2,032,848

AIRPLANE

Virgil Kutnar, Hollywood, Calif.

Application November 26, 1934, Serial No. 754,897

1 Claim. (Cl. 244—11)

The invention relates to an airplane and more especially to a rotor wing lifting and stabilizing device for the same.

The primary object of the invention is the provision of an airplane of this character, wherein through the use of rotor wings and slidable stabilizers, a direct vertical ascent and descent of the airplane may be had, in that under the rotation of the rotor wings in an outward direction when the same come near to the fuselage the air cuts under the latter and forces the airplane upward and on further rotation of the said rotor wings the air is compressed against the underside of the stabilizers or slidable wings, so that the airplane will be continuously pushed upwardly to the vertical and when such rotor wings recede from the sides of the airplane or from under the stabilizers or slidable wings they press against the air on their down stroke to force the plane straight up into the air.

Another object of the invention is the provision of a device of this character, wherein the airplane can rise vertically in the air and can remain stationary in the air and also such airplane can land upon the ground in an area approximately the size of the airplane and when in flight, by reducing the speed of rotation of the rotor wings, forward flight is assured.

A further object of the invention is the provision of a device of this character, wherein the rotor wings are operated from a motor and the slide wings are manually controlled for stabilizing purposes, the device being of novel construction and assuring the vertical ascent and descent of the plane.

A still further object of the invention is the provision of a device of this character, which is comparatively simple in its construction, thoroughly reliable and effective for its purposes strong, durable, positive in action, readily and easily operated, and inexpensive to manufacture and install.

With these and other objects in view, the invention consists in the features of construction, combination and arrangement of parts as will be hereinafter more fully described in detail, illustrated in the accompanying drawings, which disclose the preferred embodiments of the invention, and pointed out in the claim hereunto appended.

In the accompanying drawings:

Figure 1 is a top plan view of an airplane with the device constructed in accordance with the invention applied thereto and one of the stabilizers being partly broken away.

Figure 2 is a front elevation.

Figure 3 is a side elevation.

Figure 4 is a fragmentary vertical longitudinal sectional view through the airplane.

Figure 5 is a fragmentary vertical transverse sectional view on an enlarged scale.

Figure 6 is a detail sectional view on the line 6—6 of Figure 5 looking in the direction of the arrows.

Figure 7 is a detail sectional view on the line 7—7 of Figure 6 looking in the direction of the arrows.

Figure 8 is a sectional view on the line 8—8 of Figure 4 looking in the direction of the arrows.

Figure 9 is a sectional view on the line 9—9 of Figure 8 looking in the direction of the arrows.

Figure 10 is a sectional view taken on the line 10—10 of Figure 1, showing the elevator and aileron of the airplane and showing by full lines the gliding position and by dotted lines the descent position thereof.

Similar reference characters indicate corresponding parts throughout the several views in the drawings.

Referring to the drawings in detail, the airplane comprises a wheeled fuselage 10 tapering toward the nose and heel or aft ends and at the nose end is a tractor propeller 11, while at the aft or heel end is the tail piece 12 and rudder 13, respectively, while in the forepart of the fulselage is a pilot house 14.

Within the fuselage, forwardly of the pilot house 14, is a power unit 15, its drive shaft 16 at the forward end having connection with the propeller 11, while its rear end extends into the pilot house 14 for operating a train of gearing 17, certain of these, through chain and sprocket connections operating winged rotors 19, there being a pair of the same, one located at one side of the fuselage and the other at the other side and operating reversely for outward rotation. Each wing of these rotors 19 is dished or concaved, as at 20, at its leading face.

The fuselage 10 has extending laterally from opposite sides thereof the supports 21 providing at the outer extremity of each a hub 22 for the driven shaft 23 of each rotor. Each rotor is equipped with braces 24 for the wings thereof, there being preferably three wings to each rotor.

Arranged inwardly of the winged rotors are the upwardly and outwardly curved slide wings 25, these constituting stabilizers and each being equipped with the internal ribs 26, while certain of these have a guide shoe 27 slidably fitted with guides pieces or rails 28 mounted interiorly of the fuselage, 10, so that the stabalizers as constituted by the slide wings 25 are susceptible of shifting movement with respect to the fuselage 10 exteriorly of the latter and at opposite sides of the same. Certain of the other ribs 26 of each slide wing 25 carry eye members 29, these operating through slots 30 in the sides of the fuselage 10 and having connected therewith the control cable 31 which is wound to a determined extent upon a turning shaft 32 journaled in cross pieces 33 interiorly of the fuselage 10 and thus it will be seen that by the turning of the shaft 32 through the cable connection 30 these slide wings 25 can be raised and lowered with relation to the fuselage 10. One stretch of the cable 30 is passed over a guide pulley 34 mounted on the side wall of the fuselage 10 for the proper functioning of the cable for the raising and lowering action of the slide wing to which it is connected.

At the top of the fuselage 10, just rearwardly of the location of the stabilizer wings 25, is a vertically swinging elevator 35, it having hinged thereto the ailerons 36, these being operated by control cables 37 and 38, respectively, which are trained inwardly of the fuselage 10 and have connection with a control stick 39 interiorly of the pilot house 14 in convenient reach of the operator of the airplane.

At the lower portion of the fuselage 10 and extending laterally therefrom are the deflector vanes 40, while depending from the bottom of the fuselage at opposite sides of its longitudinal center are the laterally outwardly curved deflector vanes 41 which receive the force of the air at the lowermost points of the rotors 19 to operate as aid in the lifting of the airplane for the ascent in a vertical direction.

The slide wings have pivoted thereto the braces 42, these being also pivoted to the hubs 22 and thus said braces 42 in addition to bracing purposes will function to guide the said slide wings 25 in an upward and lateral curvilinear path on adjustment of the stabilizers.

The turning shaft 32 carries a hand wheel 43 arranged within the pilot house 14 for convenience of the operator of the machine.

The winged rotors 19 in the working thereof and their cooperation with the stabilizers 25 permit of ascent and descent of the airplane perpendicularly and also when the airplane is in flight it can remain stationary in the air and this is effected by reducing the speed of travel of the winged rotors 19. It is desirable to have interposed between the power unit 15 and the train of gear connection 17 with its shaft 16 a suitable transmission and clutch 44 and likewise a suitable clutch and transmission 45 is provided between said power unit 15 and the pull propeller 11, these clutches being manually controlled in any desirable manner.

By adjustment of the stabilizers 25 the ascent and descent of the airplane can be regulated, the said airplane being carried in its forward flight under the operation of the pull propeller 11, while the winged rotors in cooperation with the stabilizers enable ascent and descent in a vertical course of said airplane.

What is claimed is:

In an airplane, a fuselage, rotors having dished blades supported for rotation at the sides of the fuselage and controlled means operated by the motor of the plane for revolving the rotors, braces connecting the blades of the rotors, outwardly directed arched stabilizing wings on the sides of the fuselage over each rotor, a brace element loosely connected between each wing and the shaft for each rotor, eye members on the wings passing through slots in the fuselage, shaft operated control cables secured to said eyes and guide pulleys in the fuselage for said cables.

VIRGIL KUTNAR.